No. 650,640. Patented May 29, 1900.
H. FREDRICK.
WATER METER.
(Application filed Mar. 17, 1899.)
(No Model.) 3 Sheets—Sheet 1.
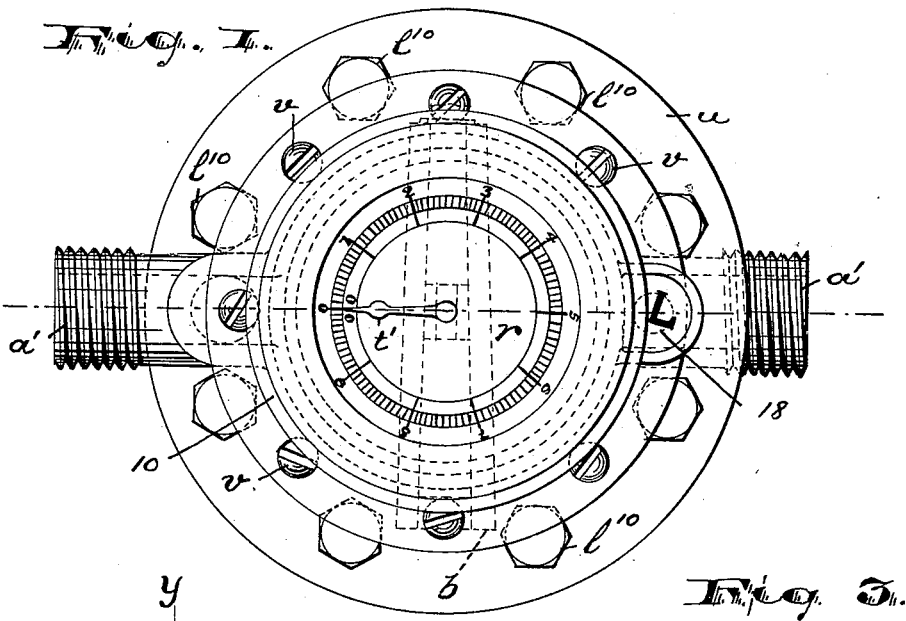
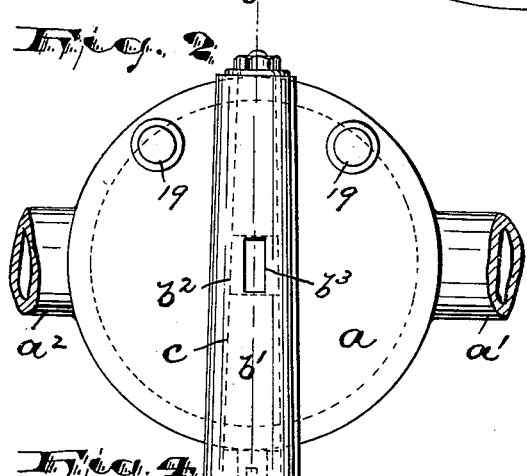
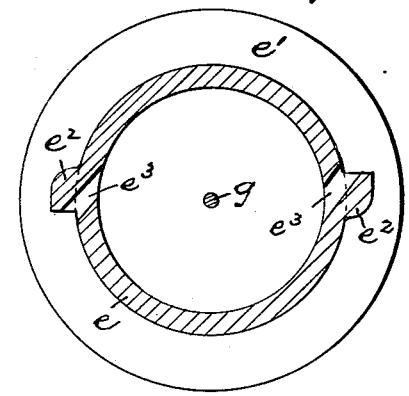
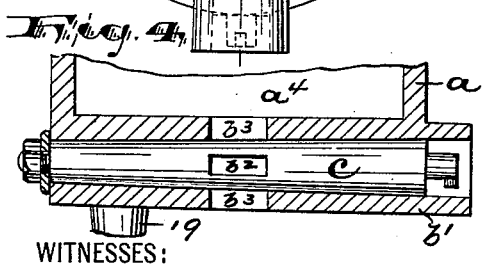
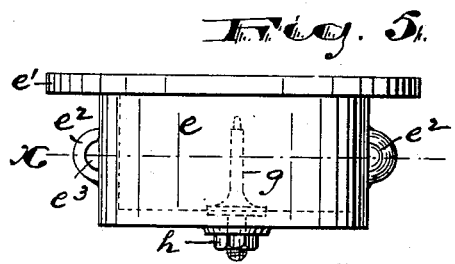
WITNESSES:
A. R. Krausse.
Russell M. Everett.
INVENTOR
Henry Fredrick,
BY
Drake & Co.
ATTORNEYS No. 650,640. Patented May 29, 1900.
H. FREDRICK.
WATER METER.
(Application filed Mar. 17, 1899.)

(No Model.) 3 Sheets—Sheet 2.

WITNESSES:
A. R. Krause.
Russell M. Everett.

INVENTOR
Henry Fredrick,
BY
Drake & G.
ATTORNEYS.

No. 650,640. Patented May 29, 1900.
H. FREDRICK.
WATER METER.
(Application filed Mar. 17, 1899.)

(No Model.) 3 Sheets—Sheet 3.

WITNESSES:
A. R. Krausse.
Russell M. Everett.

INVENTOR
Henry Fredrick,
BY
Drake & Co.
ATTORNEYS

UNITED STATES PATENT OFFICE.

HENRY FREDRICK, OF NEWARK, NEW JERSEY.

WATER-METER.

SPECIFICATION forming part of Letters Patent No. 650,640, dated May 29, 1900.

Application filed March 17, 1899. Serial No. 709,454. (No model.)

*To all whom it may concern:*

Be it known that I, HENRY FREDRICK, a citizen of the United States, residing at Newark, in the county of Essex and State of New Jersey, have invented certain new and useful Improvements in Water-Meters; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

The objects of this invention are to reduce the cost of construction of a water-meter, to secure a more exact measurement of the fluid passing therethrough, to provide a device that will be more effective in its operations and will not be injured by freezing, to obtain a construction by which the meter can be more easily cleansed, and to secure other advantages and results, some of which may be referred to hereinafter in connection with the description of the working parts.

The invention consists in the improved water-meter and in the arrangements and combinations of parts of the same, all substantially as will be hereinafter set forth and finally embraced in the clauses of the claim.

Figures 6, 7:
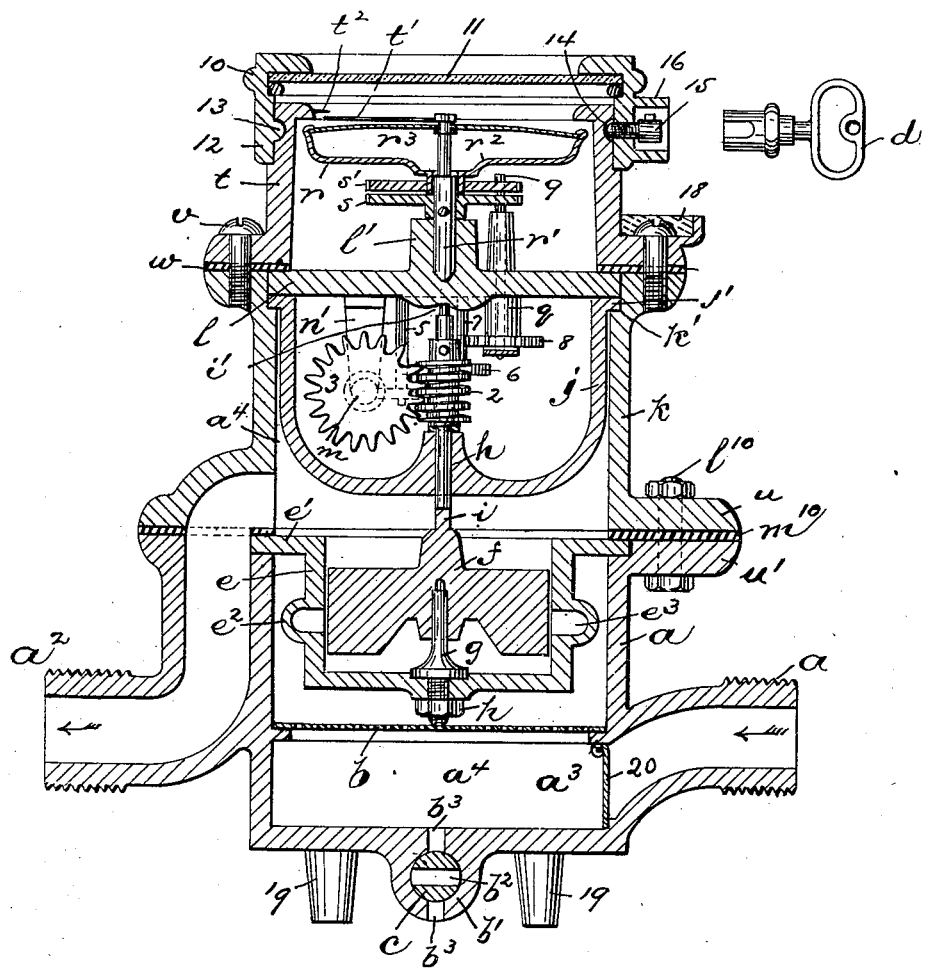
Figure 8:
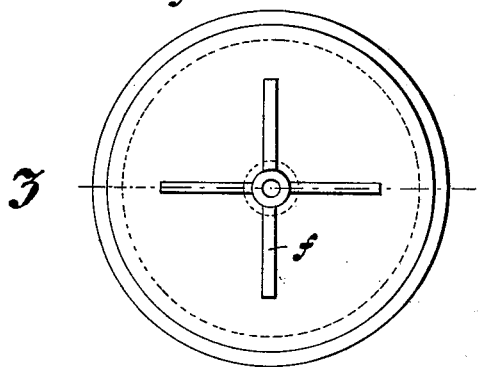
Figure 10:
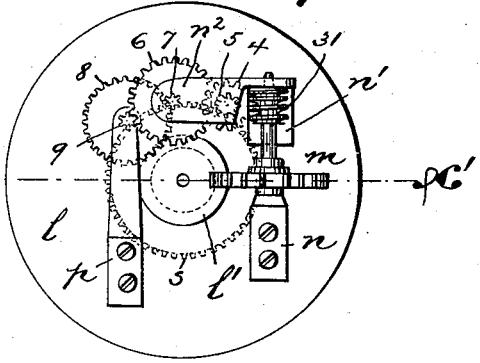
Figure 9:
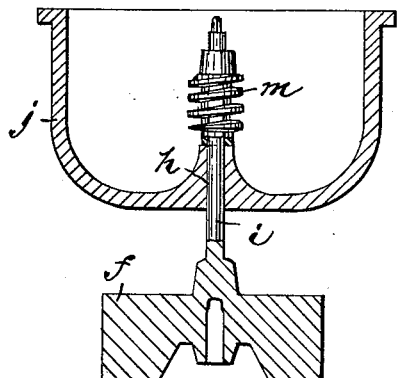
Figure 11:
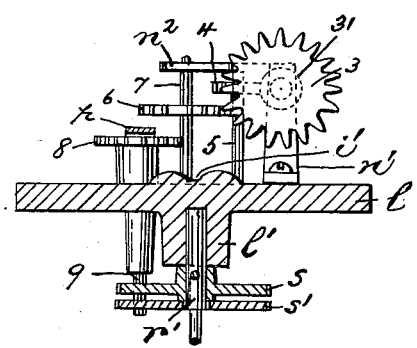
Figure 12:
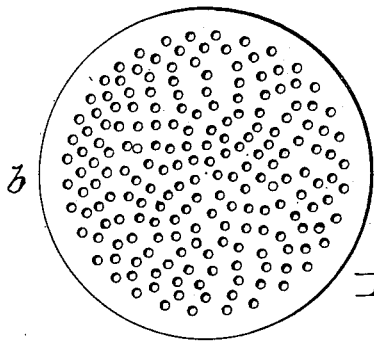

Referring to the accompanying drawings, in which like letters and numerals of reference indicate corresponding parts in each of the several views, Figure 1 is a plan of the improved meter. Fig. 2 is a bottom view of a portion of the same. Fig. 3 is a sectional view of a certain flow-cup through which the water passes in engagement with the water-wheel contained therein, the section being taken through line $x$ of Fig. 5. Fig. 4 is a section on line $y$ of Fig. 2, and Fig. 5 is a side elevation of the said flow-cup. Fig. 6 is a sectional view of the device, taken through the vertical axis thereof; and Fig. 7 is a detail view of a key which may be employed for locking the meter, so that the parts contained therein cannot be interfered with by unauthorized persons. Fig. 8 is a plan of the water-wheel arranged beneath a certain bowl-shaped inclosure for the train of wheels transmitting motion from said water-wheel. Fig. 9 is a sectional view taken at line $z$ of Fig. 8. Fig. 10 is a plan of the said gear-wheels adapted to be arranged in said bowl-shaped part in connection with the cover thereof; and Fig. 11 is a sectional view of the same, taken at line $x'$, Fig. 10. Fig. 12 is a plan of a strainer adapted to be inserted in the bottom of the meter to prevent the passage of solid matter into contact with the working parts.

In said drawings, $a$ indicates the body of the meter, which comprises a metal casting, preferably of a cylindrical form and hollowed out to provide an interior chamber $a^4$. An inlet-nozzle $a'$ is at one side and an outlet-nozzle $a^2$ at the opposite side, the said inlet-nozzle being in open communication with the bottom of the chamber $a^4$ within said body and the outlet-nozzle in open communication with the top of said chamber.

At a point a little above the inlet-nozzle is formed or arranged a shoulder $a^3$, extending around the interior of the chamber $a^4$, and on the said shoulder is arranged a perforated diaphragm or strainer $b$, adapted to prevent large particles of solid matter from passing to the working parts of the meter above said strainer. Beneath the said strainer $b$ the bottom of the body portion is provided with a seat $b'$ for a faucet $c$, the said faucet and the casting adjacent thereto being provided with waterways $b^2$ $b^3$, the waterway $b^2$ of the faucet being adapted to open and close communication through the passage $b^3$ between the interior chamber $a^4$ of the body portion and the outside of the meter.

By turning the faucet $c$ to bring the passages in open coincidence, the water entering through the inlet-nozzle $a'$ is permitted to pass out from the meter, and thus the water flushes the bottom chamber of the meter below the strainer and removes therefrom any accumulation of dirt which may have settled on the bottom of the meter. I thus am enabled to quickly cleanse the meter from time to time without detaching the same from the supply-pipes simply by turning the faucet $c$ and making provision for the reception of the dirty water which may escape. The said faucet $c$ is preferably locked by means of a key $d$, which is preferably the same key which will unlock the cover of the meter, as hereinafter provided for.

Above the strainer I arrange within the body $a$ a cup-shaped casting $e$. This is preferably provided at its upper edges with a flange $e'$, adapted to rest upon a suitable bearing provided therefor in the walls of the body of the meter. Said cup-shaped part $e$ in a plane at about midway between its top and bottom has its walls provided at opposite points with projections or bosses $e^2$, and through the said bosses are formed waterways or passages $e^3$, which are disposed tangentially with relation to the vertical axis of the bowl, as indicated in Fig. 3, so that the two passages open outward in opposite directions. Thus the water entering up through the perforated diaphragm or strainer $b$ passes through the perforations $e^3$, forming two streams of water which enter the bowl at an angle to the radii of the bowl at said perforations and impinge upon the wings of a water-wheel $f$ within said bowl. The said protuberances $e^2$ preferably project radially and present plane faces to the inflowing current of water. The perforations $e^3$ terminate outwardly at said surfaces, and thus are in a position to most readily receive the water and conduct it to the water-wheel with the least retardation or obstruction. The plane faces of said protuberances thus serve an important function on guiding the flow of water with an increased directness and prevent an idle circling of currents between the cup-shaped casting and the body of the meter before passing through the perforations in the walls. A more regular and perfect measurement is thus secured. At the center of the bottom of said bowl is secured an interior stud $g$, upon which the said water-wheel $f$ is raised, the said water-wheel being perforated or bored out centrally to receive said stud and rotate freely thereon. Said stud is preferably fastened to the bottom of the bowl by means of a nut $h$ or by any other suitable means, and forms a bottom bearing for the water-wheel, as described. Said water-wheel is preferably all of one integral piece or casting, both shaft and blades, and is preferably composed of bronze in order to withstand freezing and the action of the water. The said water-wheel is provided at its upper side with a shaft $i$ in alinement with said stud $g$, which extends upward and passes through a central perforation $h$ in the bottom of a bowl-shaped casting $j$. Said bowl-shaped casting $j$ is seated in the body $a$ of the meter in a manner similar to the lower cup-shaped casting $e$ containing the water-wheel, being preferably flanged at its upper edges, as at $j'$, and resting upon a suitable shoulder $k'$, formed on the inner walls of the body. Said bowl-shaped casting $j$ is adapted to contain the train of gear-wheels transmitting motion from the water-wheel $f$ to the registering devices, to be hereinafter described, and to this end a top or cover $l$ is provided for said casting $j$, which provides bearings for said gear-wheels at both its upper and lower surfaces. Said plate or cover $l$ has its edges lying in the recess formed for the supporting-flange $j'$ of the bowl-shaped casting, and is thus adapted to be secured firmly thereupon.

The shaft $i$ of the water-wheel extends centrally up through the bottom of the casting $j$, and at its upper end has a bearing in a recess $i'$ at the under side of the plate $e$. Upon said shaft at a point within the chamber of the casting $j$ is keyed a worm 2, and said worm meshes with a worm-wheel 3 upon a horizontal shaft $m$, pivoted in bearings $n$ $n'$, extending down from the plate $l$. The opposite end of said shaft $m$ carries a worm 31, which meshes into a gear-wheel 4, fast on a vertical pinion 5, and meshing with another gear-wheel 6, fast on a second pinion 7, both said pinions 5 and 7 having bearings at one end in the plate $l$ and at the other end in a prolongation or extension $n^2$ of the bearing-piece $n'$. Said gearing described serves to decrease rapidity of motion, and the last-mentioned pinion 7 meshes with a wheel 8, whose shaft $q$ extends up through the plate $l$, and has a bearing at its lower end upon a bracket $p$, fixed to said plate. It will be evident that the said transmitting mechanism or gearing may be changed or modified as desired without affecting my invention, the particular style set forth being shown merely for purposes of description.

The upper surface of the plate $l$ has a central boss $l'$, forming a seat or bearing for the shaft or pin $r'$ of the dial $r$, said dial being loose upon the upper end of said pin, so that while said pin may be rotated in its seat yet the dial can be independently rotated upon the pin, if desired. To accomplish rotation, two parallel gear-wheels $s$ $s'$ are arranged just below the dial $r$, said wheels both meshing with the pinion 9 upon the shaft $q$, before described. One of the gear-wheels, as $s$, is keyed or fixed upon the pin $r'$, while the other wheel $s'$ is fast on a downward sleeve-like extension of the dial $r$. It will thus be seen that the pair of gear-wheels $s$ $s'$ cause the pin $r'$ and dial $r$, respectively, to rotate, and the wheel $s$ being made with fewer teeth than the wheel $s'$ the hand $t'$ is caused to move faster than the dial $r$ and to record thereon the number of revolutions of said dial, as is common.

The dial-plate $r$ is of any usual construction, but preferably hollow, as shown, and formed of upper and lower sections $r^2$ $r^3$, pressed together. A hand or pointer $t'$ is provided above said dial, fixed upon the upper end of the pin $r'$, and therefore stationary with relation thereto.

An upper extension $t$ of the body of the meter provides a chamber for the dial-plate, and at the upper edge of said upper extension a pointer $t^2$ projects inward over the edge of the dial. It will thus be evident that at any time the meter is read by observing the difference between the positions of the pointer $t^2$ and hand $t'$. Suitable smaller dials (not shown) may be arranged independent of the main dial to register higher amounts, as is common in the art.

To facilitate access to the various parts, I form the body of the meter in two sections, the horizontal plane of division being just above the water-wheel $f$ and the two sections being flanged, as at $u$ $u'$, to receive bolts $l^{10}$, suitable packing $m^{10}$ being interposed between the parts to effect an impervious joint. The upper extension $t$, inclosing the dial and coöperating parts, is likewise flanged to rest upon the correspondingly-flanged top of the body and receive screws $v$ and packing $w$ therebetween. Said upper extension reaches inwardly over the edge of the plate $l$, and thus holds said plate down firmly in place. The top of the upper extension is open and a cap 10, having a glass top 11, is adapted to be locked in place thereupon. Any locking means common to the art may be employed; but I prefer to provide the flange 12 of the cap at one side with a projection 13, adapted to enter a recess 14 in the extension $t$, the opposite side of the cap having a screw 15, adapted to be forced inward into the recess 14. Said screw 15 has a peculiarly-shaped head lying in a socket 16 on the cap, and a key $d$ is provided for operating said screw. By this means the dial $r$ is secured against tampering by any person not possessing the key $d$, and for the same purpose the screws $v$, fastening the upper extension $t$ to the body, are sealed in position with wax or a like substance, as shown at 18.

Legs 19 may be provided at the bottom of the body part $a$ of the meter, if desired, to enable the meter to stand upright more securely.

At the point where the inlet A' opens into the chamber $a^4$ of the meter I prefer to place a valve 20, hinged at its upper edge to its seat and adapted to swing inwardly into the chamber $a^4$. Said valve presents no obstacle to the forward movement of water through the meter, but prevents any backward flow, the said valve being automatically operated by the force of the water-current, as will be understood.

Having thus described the invention, what I claim as new is—

The herein-described water-meter, comprising a body portion, upper and lower cup-shaped castings depending into said body portion, a water-wheel pivoted in said lower cup-shaped casting and having its shaft projecting into the upper cup-shaped casting, registering mechanism in said upper cup-shaped casting, a strainer-plate arranged beneath said lower cup-shaped casting, a cleaning-faucet in the bottom of the body portion and an inflow-entrance at the side with a check-valve preventing outward flow through said inflow-passage, protuberances on the outer walls of the lower cup-shaped castings and perforations through the walls of said casting forming passages which open outwardly at the sides of said protuberances, the said body portion of the meter being separable at a transverse plane between said upper and lower cup-shaped castings, substantially as set forth.

In testimony that I claim the foregoing I have hereunto set my hand this 9th day of March, 1899.

HENRY FREDRICK.

Witnesses:
CHARLES H. PELL,
C. B. PITNEY.